(12) United States Patent
Glatfelter et al.

(10) Patent No.: US 10,291,326 B2
(45) Date of Patent: May 14, 2019

(54) COMMUNICATION SYSTEMS AND METHODS

(71) Applicant: The Boeing Company, Chicago, IL (US)

(72) Inventors: John William Glatfelter, Kennett Square, PA (US); Michael Kevin Hernandez, Charleston, SC (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 15/276,262

(22) Filed: Sep. 26, 2016

(65) Prior Publication Data

US 2018/0091226 A1 Mar. 29, 2018

(51) Int. Cl.
| | | |
|---|---|---|
| *H04B 10/04* | (2006.01) | |
| *H04B 10/524* | (2013.01) | |
| *H04B 10/25* | (2013.01) | |
| *H04B 10/572* | (2013.01) | |
| *H04J 14/02* | (2006.01) | |

(52) U.S. Cl.
CPC ....... *H04B 10/524* (2013.01); *H04B 10/2504* (2013.01); *H04B 10/572* (2013.01); *H04J 14/02* (2013.01); *H04J 14/0257* (2013.01)

(58) Field of Classification Search
CPC .............. H04B 10/524; H04B 10/2504; H04B 10/5051; H04B 10/5053; H04B 10/5161; H04B 10/572; H04B 10/516; H04B 10/0795; H04J 14/02; H04J 14/0257; H04J 14/0241; H04J 14/0246; H04J 14/0227; H04L 45/62; H04Q 2011/0075

USPC .... 398/182, 183, 190, 191, 98, 193, 140, 25
See application file for complete search history.

(56) References Cited

U.S. PATENT DOCUMENTS

| | | | | |
|---|---|---|---|---|
| 5,479,164 A | * | 12/1995 | Yorks ...................... | H04J 14/02 250/568 |
| 6,005,960 A | * | 12/1999 | Moore ...................... | G09F 3/00 382/111 |
| 6,330,381 B1 | * | 12/2001 | Lu ..................... | H04B 10/25137 385/123 |
| 6,832,051 B2 | * | 12/2004 | Lu ..................... | H04B 10/25137 385/123 |
| 7,266,307 B2 | * | 9/2007 | Shpantzer ........ | H04B 10/25137 398/155 |

(Continued)

OTHER PUBLICATIONS

European Search Report and Written Opinion issued by the European Patent Office for European Patent Application No. 17192935.9, dated Jan. 25, 2018 (10 pages).

(Continued)

*Primary Examiner* — Hibret A Woldekidan
(74) *Attorney, Agent, or Firm* — McDonnell Boehnen Hulbert & Berghoff LLP

(57) ABSTRACT

In an example, a method of communication includes receiving a data set comprising a plurality of data items, and analyzing the data set to determine a plurality of distinct data values of the plurality of data items. The method also includes associating, based on the analysis of the data set, each distinct data value with a respective wavelength among a plurality of wavelengths. The method further includes transmitting each data item, one data item at a time, as an optical signal at the wavelength associated with the distinct data value of the data item.

22 Claims, 7 Drawing Sheets

(56) References Cited

U.S. PATENT DOCUMENTS

| | | | | |
|---|---|---|---|---|
| 7,409,159 B2* | 8/2008 | Izadpanah | .......... | H04B 10/1149 |
| | | | | 379/56.1 |
| 7,826,741 B2* | 11/2010 | Katagiri | ................ | H04J 3/1664 |
| | | | | 370/351 |
| 8,351,798 B2* | 1/2013 | Edirisinghe | ...... | H04B 10/07953 |
| | | | | 398/193 |
| 8,725,004 B1* | 5/2014 | Vawter | ...................... | G02F 7/00 |
| | | | | 341/137 |
| 8,755,048 B2* | 6/2014 | Funayama | ................ | G01J 3/02 |
| | | | | 356/402 |
| 8,855,303 B1 | 10/2014 | Glatfelter et al. | | |
| 9,121,818 B2* | 9/2015 | Funayama | .............. | G01J 3/027 |
| 9,185,083 B1* | 11/2015 | Glatfelter | ............ | H04L 63/0428 |
| 9,983,059 B2* | 5/2018 | Nciri | ........................ | G01J 3/10 |
| 2004/0136724 A1 | 7/2004 | Mansbridge | | |
| 2012/0177373 A1* | 7/2012 | Choi | .................. | H04J 14/0235 |
| | | | | 398/72 |
| 2014/0177951 A1* | 6/2014 | Biffar | ................ | G06F 17/30253 |
| | | | | 382/161 |
| 2016/0091117 A1* | 3/2016 | Boccoleri | .............. | F16M 11/10 |
| | | | | 348/804 |
| 2016/0094290 A1* | 3/2016 | Nishino | ............... | H04B 10/564 |
| | | | | 701/517 |
| 2016/0099602 A1* | 4/2016 | Leabman | ................ | H02J 7/025 |
| | | | | 307/104 |

OTHER PUBLICATIONS

Co-Pending U.S. Appl. No. 14/724,202, filed May 28, 2015.

\* cited by examiner

| Data Item | Distinct Data Value | Wavelength |
|---|---|---|
| A | 0100 0001 | 1260 nm |
| B | 0100 0010 | 1261 nm |
| C | 0100 0011 | 1262 nm |
| ... | ... | ... |
| X | 0101 1000 | 1283 nm |
| Y | 0101 1001 | 1284 nm |
| Z | 0101 1010 | 1285 nm |
| ... | ... | ... |
| the | 01110100 01101000 01100101 | 1671 nm |
| an | 01100001 01101110 | 1672 nm |
| can | 01100011 01100001 01101110 | 1673 nm |
| sound | 01110011 01101111 01110101 01101110 01100100 | 1674 nm |
| In addition | 01001001 01101110 00100000 01100001 01100100 01100100 01101001 01110100 01101001 01101111 01101110 | 1675 nm |

FIG. 2

COMMUNICATION SYSTEMS AND METHODS

FIELD

The present disclosure generally relates to communication systems, and more particularly to, systems and methods that provide for optical communication.

BACKGROUND

Unless otherwise indicated herein, the materials described in this section are not prior art to the claims and are not admitted to be prior art by inclusion in this section.

Optical communication uses light as a transmission medium to carry information from a source to a destination. In particular, the light forms an electromagnetic carrier wave that is modulated to carry the information. To transmit data, an optical communication system generally includes a transmitter, a channel, and a receiver. The transmitter encodes the data into an optical signal, the channel carries the optical signal to the receiver, and the receiver decodes to reproduce the data from the received optical signal.

Conventionally, the data is encoded into the optical signal by switching a laser on and off to transmit a series of light pulses. The occurrence of the light pulse within a given transmission time interval (TTI) represents a "1" binary value and the absence of the light with a given TTI represents a "0" binary value. Accordingly, using such conventional techniques, a single bit of data is communicated during each TTI. As a result, the maximum rate at which such data can be transmitted, received, and processed is generally limited by the speed at which the transmitter can switch on and off and/or the speed at which the receiver can detect transitions between a "1" and a "0" in the received light pulses.

SUMMARY

A method and system for communication is disclosed. In an example, a method of communication includes receiving a data set including a plurality of data items, and analyzing the data set to determine a plurality of distinct data values of the plurality of data items. The method also includes associating, based on the analysis of the data set, each distinct data value with a respective wavelength among a plurality of wavelengths. The method further includes transmitting each data item, one data item at a time, as an optical signal at the wavelength associated with the distinct data value of the data item.

In another example, a system includes an electromagnetic radiation (EMR) source, a non-transitory computer readable media, and a processor. The EMR source is configured to transmit a plurality of optical signals at a plurality of wavelengths. The non-transitory computer readable media configured to store a data set comprising a plurality of data items. The processor is configured to: (i) analyze the data set to determine a plurality of distinct data values of the plurality of data items, (ii) associate, based on the analysis of the data set, each distinct data value with a respective wavelength among the plurality of wavelengths, and (iii) cause the EMR source to transmit each data item, one data item at a time, at the wavelength associated with the distinct data value of the data item.

In another example, a method of communication includes receiving a plurality of data sets, which each include a respective plurality of data items. The method also includes, for each data set, (i) analyzing the data set to determine a plurality of distinct data values of the data set, (ii) associating, based on the analysis of the data set, each distinct data value of the data set with a respective wavelength among a plurality of wavelengths, and (iii) transmitting each data item of the data set, one data item at a time, as an optical signal at the wavelength associated with the distinct data value of the data item. At least two data sets of the plurality of data sets include at least one data item, which is (a) of the same distinct data value and (b) associated with a different wavelength of the plurality of wavelengths.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

FIG. 2 depicts a data-to-wavelength map according to an example embodiment.

DETAILED DESCRIPTION

I. Overview

The methods and systems of the present disclosure provide for data communication and, more particularly, data communication using optical signals. Within examples, the methods and systems of the present disclosure can dynamically map data to different wavelengths over a range of wavelengths and then transmit the data as a series of optical signals at the wavelengths dynamically mapped to the data. In this way, the data can be encoded by a first device and decoded by a second device based on the wavelength of the optical signals transmitted and received, respectively. Beneficially, a given wavelength can be used to represent more than just a single bit of data and, thus, a greater quantity of data can be transmitted during a given TTI as compared to conventional approaches for optical communication. These and other benefits are described in further detail below.

II. Example Systems

Figure 1:
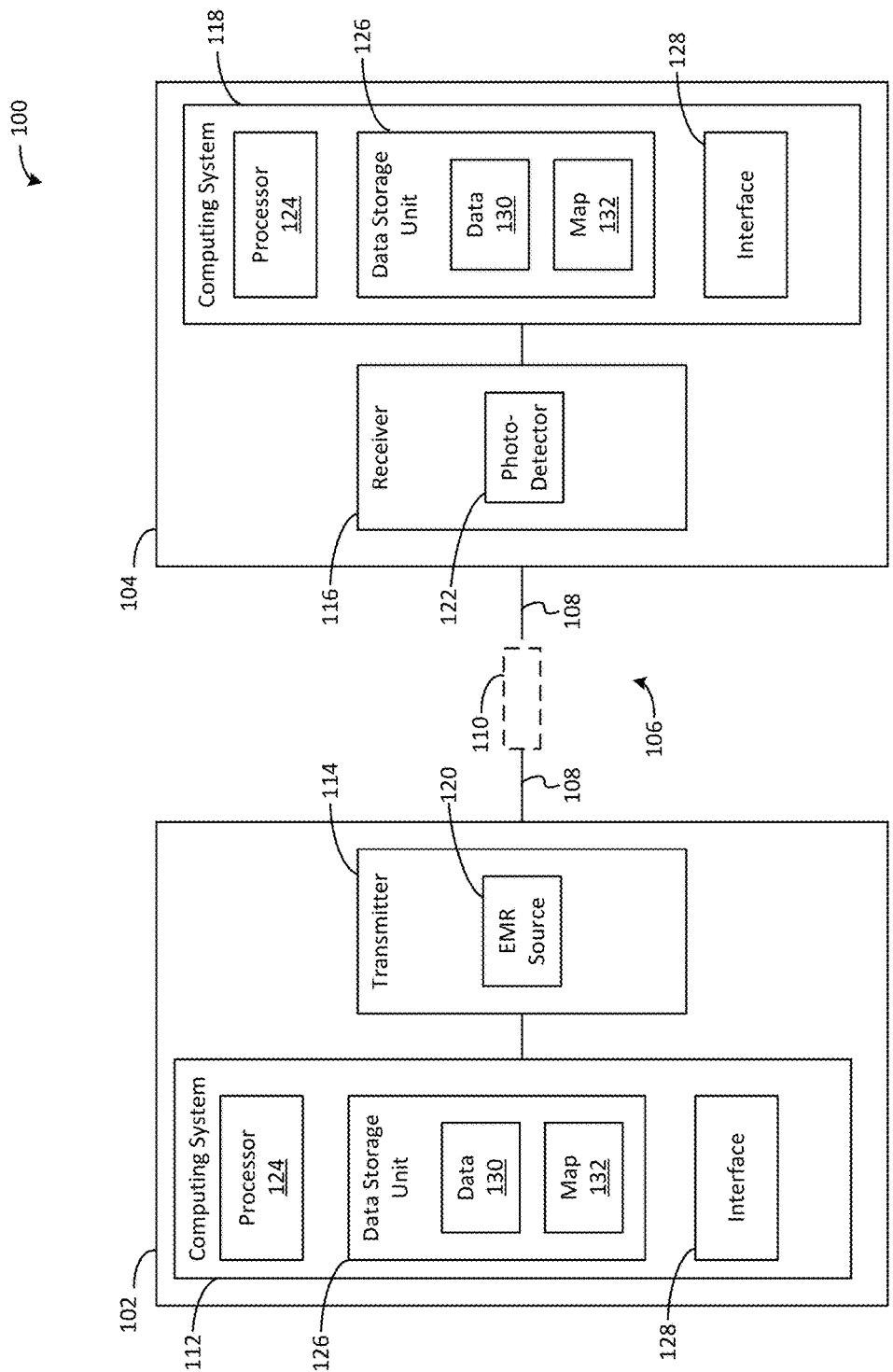
FIG. 1 depicts a simplified block diagram of a communication system according to an example embodiment.

FIG. 1 is a simplified block diagram of an example communication system 100. As shown in FIG. 1, the communication system 100 includes a first optical communication device 102 and a second optical communication device 104. Although FIG. 1 depicts the communication system 100 as including two optical communication devices 102 and 104, the communication system 100 can include more than two optical communication devices in further examples.

The first optical communication device 102 communicates with the second optical communication device 104 over an optical communication link 106. In FIG. 1, the optical communication link 106 includes one or more optical fibers 108. Further, the optical communication link 106 can optionally include additional optical components 110 such as, for example, one or more optical amplifiers and/or one or more optical regenerators to facilitate communicating optical signals between the first optical communication device 102 and the second optical communication device 104 over relatively long distances.

As shown in FIG. 1, the first optical communication device 102 includes a first computing system 112 operatively coupled to a transmitter 114. As described in detail below, the first computing system 112 performs an analysis of data to be transmitted from the first optical communication device 102 to the second optical communication device 104. Based on the analysis, the first computing system 112 encodes the data into optical signals having a plurality of different wavelengths. The first computing system 112 then causes the transmitter 114 to transmit, via the optical communication link 106, the optical signals at the plurality of different wavelengths.

The second optical communication device 104 includes a receiver 116 operatively coupled to a second computing system 118. The receiver 116 of the second optical communication device 104 receives the optical signals from the optical communication link 106 and the second computing system 118 processes the received optical signals to decode the data. In this arrangement, the communication system 100 of FIG. 1 is configured for unidirectional optical communication of data from the first optical communication device 102 to the second optical communication device 104. An example communication system 1000 configured for bidirectional optical communication of data between two optical communication devices will be described below with reference to FIG. 10.

In line with the discussion above, the transmitter 114 can transmit optical signals at a plurality of different wavelengths. To do so, the transmitter 114 can include one or more wavelength-tunable EMR sources 120. As an example, the EMR source(s) 120 can include one or more lasers, light emitting diodes (LEDs), and/or other light sources, which can generate light at a range of wavelengths. The EMR source(s) 120 can also include one or more optical components, which selectively tune the generated electromagnetic radiation (e.g., light) to a particular wavelength selected from among the range of wavelengths for a given optical signal. Example optical component(s), which can facilitate tuning the EMR source(s) 120 to selected wavelengths, can include one or more optical filters, gratings, and/or etalons.

In one example implementation, the EMR source(s) 120 can transmit optical signals at wavelengths in a range of approximately 1260 nm to approximately 1675 nm. In another example implementation, the EMR source(s) 120 can additionally or alternatively transmit optical signals at wavelengths in a range from approximately 420 nm to approximately 700 nm. The EMR source(s) 120 may transmit optical signals at wavelengths in other ranges in further examples.

The first computing system 112 can control operation of the transmitter 114 to cause the transmitter 114 to transmit each optical signal at a wavelength selected from among the plurality of wavelengths. For example, the first computing system 112 can provide to the transmitter 114 a control signal indicating a wavelength from among the plurality of wavelengths and, responsive to the transmitter 114 receiving the control signal, the transmitter 114 can transmit the optical signal at the indicated wavelength. As such, the EMR source 120 can selectively generate an optical signal at a wavelength selected from a range of wavelengths responsive to the control signals provided by the first computing system 112.

The receiver 116 of the second optical communication device 104 can receive the optical signals from the optical communication link 106, detect the wavelength of each optical signal, and responsively provide a signal indicative of the detected wavelength to the second computing system 118. As an example, the receiver 116 can include a photodetector 122, which can detect the wavelength of an optical signal received from the optical communication link 106.

The first computing system 112 and the second computing system 118 can process information and control aspects of the communication system 100. As shown in FIG. 1, the first computing system 112 and the second computing system 118 can each include one or more processors 124 and/or one or more data storage units 126. The processors 124 can be implemented as a combination of hardware and software elements. The hardware elements may include combinations of operatively coupled hardware components, including microprocessors, communication/networking interfaces, memory, signal filters, circuitry, etc. The processors 124 can be configured to perform operations specified by the software elements, e.g., computer-executable code stored on computer readable medium. The processors 124 can be implemented in any device, system, or subsystem to provide functionality and operation according to the present disclosure. The processors 124 can be implemented in any number of physical devices/machines. For example, the first computing system 112 and the second computing system 118 can include one or more shared or dedicated general purpose computer systems/servers. Indeed, parts of the processing of the example embodiments can be distributed over any combination of processors for better performance, reliability, cost, etc.

The physical devices/machines can be implemented by the preparation of integrated circuits or by interconnecting an appropriate network of component circuits, as is appreciated by those skilled in the electrical art(s). The physical devices/machines, for example, may include field programmable gate arrays (FPGA's), application-specific integrated circuits (ASIC's), digital signal processors (DSP's), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium or a combination of computer readable media of the data storage unit 126, the computing systems 112, 114 may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors 124 may include, or be otherwise combined with, computer-readable media. Some forms of computer-readable media may include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

As also shown in FIG. 1, the first computing system 112 and the second computing system 118 can include a communication interface 128. The communication interface 128 can allow the first computing system 112 and the second computing system 118 to connect to and/or communicate with each other and/or another other entity according to one or more protocols. In one example, communication interface 128 can be a wired interface, such as an Ethernet interface, a fiber optic interface, or a high-definition serial-digital-interface (HD-SDI). In another example, communication interface 128 can be a wireless interface, such as a cellular or WI-FI interface.

III. Example Operations

In operation, the first computing system 112 can receive a data set 130 that is to be transmitted from the first optical communication device 102 to the second optical communication device 104. The data set 130 can include one or more structured and/or unstructured data sets. For instance, the data set 130 can include data comprising one or more text files, video files, audio files, image files, email files, Hypertext Markup Language (HTML) files, encrypted data, binary data, compressed data formats, computer-aided-design formats, technical publication formats, graphical information system formats, database files, internet user datagram protocol (UDP) and transmission control protocol (TCP) formats, television signal formats, telephone signals, digital broadcasting formats, gaming formats, combinations thereof, and/or the like. The first computing system 112 can receive the data set 130 from an external source (e.g., from another device and/or a user via the communication interface 128) and/or as a result of local processing by the processor 124 of the first computing system 112. As shown in FIG. 1, the first computing system 112 can store the data set 130 in the data storage unit 126.

The data set 130 can include a plurality of data items. In general, a data item can be any discrete unit of data having a quantifiable data value. For example, each data item can include a quantity of bits that represents a binary numeric value of the data item. In one implementation, the quantity of bits can be eight such that each data item represents a byte value; however, the data items of a data set 130 can include greater or fewer quantities of bits in other implementations.

Further, within examples, all data items in the data set 130 can have the same quantity of bits or, alternatively, the data set 130 can include data items having different quantities of bits (i.e., at least one data item of the data set 130 can have a different quantity of bits than at least another data item of the data set 130). For instance, in a first example, the data set 130 can be a text file and the plurality of data items can represent characters that comprise the contents of the text file. In this first example, each character can be represented by a data value in accordance with a character encoding such as, e.g., a byte value according to the American Standard Code for Information Interchange (ASCII). In a second example in which the data set is a text file, some data items can represent characters in the text file while other data items can represent words and/or phrases in the text file (e.g., a text string including two or more characters). Thus, in the first example, all data items in the data set may have the same quantity of bits (e.g., eight bits) and, in the second example, some data items may have eight bits while other data items may have greater than eight bits.

The first computing system 112 can analyze the data set 130 to determine a plurality of distinct data values of the plurality of data items. For example, the data storage unit 126 of the first computing system 112 can store a corpus containing potential distinct data values that may be contained within the data set, and the first computing system 112 can use the corpus to identify the distinct data values that are present in the particular data set analyzed by the first computing system 112. As an example, the corpus can include an ASCII table and/or a binary code library. In another example, the corpus can include a plurality of characters, words, and/or phrases from one or more languages (e.g., a multi-lingual character set, word set, and/or phrase set).

In one implementation, the plurality of distinct data values can include a range of values represented by a quantity of binary bits. For instance, the quantity of binary bits can be eight such that each distinct data value corresponds to a respective byte value. However, as noted above, the data items of a data set 130 can include greater or fewer quantities of bits and, thus, the plurality of distinct data values can be represented by greater or fewer quantities bits in other implementations. In another example implantation, the plurality of distinct data values represent a plurality of text characters and/or one or more text strings, where each text string includes two or more of the text characters. In yet another example, the plurality of distinct data values represent a plurality of text characters from a plurality of different languages.

Based on the analysis of the data set 130, the first computing system 112 can associate each distinct data value with a respective wavelength among a plurality of wavelengths that the transmitter 114 can transmit. The first computing system 112 can further generate a data-to-wavelength map 132 that indicates for each distinct data value, on a per distinct data value basis, the respective wavelength associated with the distinct data value. In this way, the first computing system 112 can, based on the analysis of the data set 130, dynamically encode the data items of the data set 130 into wavelengths at which the transmitter 114 can transmit optical signals.

The quantity of distinct data items that can be mapped to respective wavelengths can be based on, for example, (i) the range(s) of wavelengths at which optical signals can be generated by the transmitter 114 and/or (ii) the capability of the receiver 116 to discriminate among the wavelengths. For instance, in an implementation in which the transmitter 114 can generate and the receiver 116 can discriminate optical signals at each integer wavelength over a wavelength range of approximately 1260 nm to approximately 1675 nm, there can be 416 different wavelengths with which the first computing system 112 can map distinct data values.

The first computing system 112 can analyze the data set 130 and generate a data-to-wavelength map 132 based on one or more factors. For example, the first computing system 112 can analyze the data set to determine a data-to-wavelength map that (i) allows the entire data set 130 to be represented by the data-to-wavelength map and (ii) reduces (or minimizes) the number of optical signals required to transmit the entire data set 130. In one implementation, to analyze the data set, the first computing system 112 can determine a frequency of occurrence of each distinct data value in the data set, and the first computing system 112 can then generate the data-to-wavelength map based on the determined frequency of occurrence of each distinct data value.

FIG. 2 illustrates an example data-to-wavelength map 232 according to an example embodiment. As shown in FIG. 2, the data-to-wavelength map 232 is in the form of a table having a row for each available wavelength over a range of wavelengths. The data-to-wavelength map 232 further includes a first column that indicates data items in a data set, a second column that indicates a corresponding distinct data value for each data item, and a third column that indicates a respective wavelength associated with each data item. In this example, the data items include characters, words, and phrases contained in a text file. Further, in this example, the first computing system 112 generated the data-to-wavelength map 232 by first mapping characters in the text file to a first portion of the range of wavelengths and then mapping the most frequently occurring words and/or phrases to the remaining available wavelengths in the range of wavelengths.

In FIG. 2, the example data-to-wavelength map 232 includes data items having distinct data values for characters in a character set. As shown in FIG. 2, in some embodiments, an alphabetic order of the character set can be mapped to the plurality of wavelengths in a sequential order of the plurality of wavelengths. However, in alternative embodiments, the characters of a character set can be mapped to the plurality of wavelengths such that an alphabetic order of the character set is mapped in a non-sequential order of the plurality of wavelengths. Doing so can help to encrypt data transmissions from the first optical communication device 102 to the second optical communication device 104. Additionally or alternatively, other encryption techniques can be used to facilitate mapping the distinct data values to the plurality of wavelengths (e.g., using algebraic algorithms and/or trigonometric algorithms). Such encryption techniques may facilitate mapping the character set to the plurality of wavelengths such that an alphabetic or non-alphabetic order of the character set is mapped to the plurality of wavelengths in a sequential and/or non-sequential order of the plurality of wavelengths.

In some embodiments, the first computing system 112 can dynamically determine the entire data-to-wavelength map 132 based on the analysis of the data set 130. In alternative embodiments, a first portion of the data-to-wavelength map 132 can be static and the first computing system 112 dynamically determines a second portion of the data-to-wavelength map 132. In other words, a first portion of the wavelengths in the data-to-wavelength map 132 can be associated with particular distinct data values before the first computing system 112 analyzes the data set, and a second portion of the wavelengths in the data-to-wavelength map 132 can be associated with other distinct data values based on the analysis of the data set 130. For example, the first computing system 112 can generate a data-to-wavelength map 132 that (i) statically maps the characters of a character set to the first portion of the wavelengths and (ii) dynamically maps words and/or phrases (i.e., text strings of two or more characters) to the second portion of wavelengths in the data-to-wavelength map 132.

After the first computing system 112 associates the distinct data values of the data items with respective wavelengths, the first computing system 112 causes the transmitter 114 to transmit each data item, one data item at a time, as an optical signal at the wavelength associated with the distinct data value of the data item. For example, as described above, the first computing system 112 can provide one or more control signals to the transmitter 114 to indicate a sequence of wavelengths at which the optical signals are to be transmitted. Responsive to the control signal(s), the EMR source 120 transmits, for each data item, a pulse of electromagnetic energy at the respective wavelength associated with the distinct data value of the data item.

The receiver 116 of the second optical communication device 104 receives the optical signals from the optical communication link 106. The receiver 116 can also detect the wavelength of each optical signal and provide an indication of the detected wavelength for the optical signal to the second computing system 118. The second computing system 118 can receive the data-to-wavelength map 132 from the first computing system 112 (e.g., via the optical communication link 106 and/or the communication interface 128) and use the data-to-wavelength map 132 to decode the data set 130 from the detected wavelengths of the optical signals received by the receiver 116. The second computing system 118 can then store the decoded data set 130 in the data storage unit 126 of the second computing system 118.

The systems and methods of the present disclosure can beneficially facilitate more efficient and faster optical communication than conventional techniques. As noted above, conventional techniques may transmit a single bit of data per TTI. Thus, eight TTIs are required to transmit each byte of data in conventional optical communication systems.

In the systems and methods of the present disclosure, however, more than a single bit of data can be transmitted during each TTI as multiple bits of data can be represented by a particular wavelength of an optical signal. Thus, the systems and methods of the present disclosure can transmit a significantly greater amount of data in the same time it takes to transmit a single bit of data in a conventional system. This can be seen, for example, in the data-to-wavelength map 232 of FIG. 2. For instance, as shown in FIG. 2, the first optical communication device 102 can transmit a byte of data for the letter "A" by transmitting an optical signal at a wavelength of 1260 nm during a single TTI. As a result, the first optical communication device 102 can transmit the letter "A" eight times faster than in a conventional system in which eight TTIs are required to represent the binary numeric value of the letter "A".

As further shown by the example of FIG. 2, even greater quantities of bits can be mapped to a given wavelength. For instance, in FIG. 2, the phrase "in addition" (i.e., 88 bits of data) can be transmitted in a single TTI by an optical signal at a wavelength of 1675 nm. Yet to transmit this same phrase using conventional approaches would require 88 TTIs. It can thus be seen that the systems and methods of the present disclosure may improve data bit rates by even greater than a factor of eight according to some example embodiments.

Additionally, the systems and methods of the present disclosure can beneficially facilitate secure data communications. For example, without access to the data-to-wavelength map, it can be difficult (or perhaps impossible) to decode the data set from the transmitted optical signals. As another example, the first computing system 112 can be configured to select wavelengths among a plurality of wavelengths that are less commonly used for data communications over optical fibers. For instance, many optical systems transmit optical signals at approximately 1550 nm. Because the systems and methods of the present disclosure can transmit optical signals over a range of wavelengths, an intruder looking for signals at 1550 nm or another specific wavelength will not be able to ascertain the full scope of the data communication.

Figure 3:
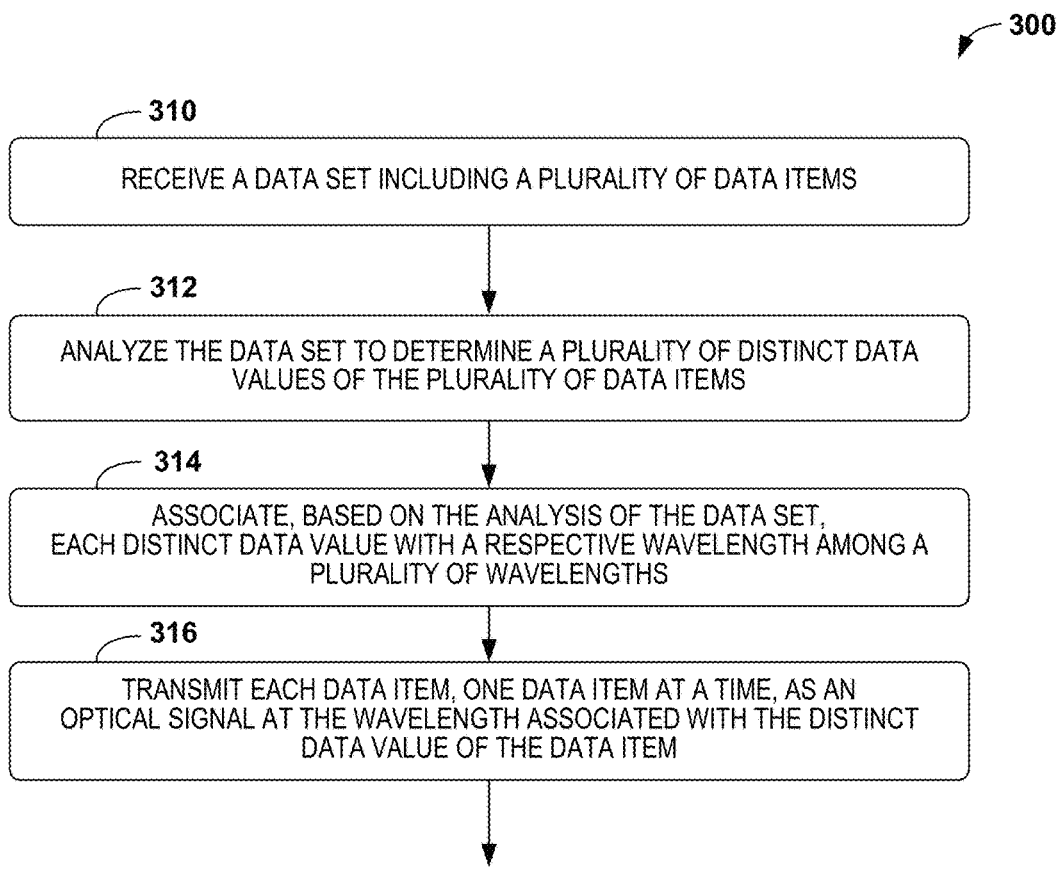
FIG. 3 depicts a flow chart of an example process for communication, according to an example embodiment.

Referring now to FIG. 3, a flowchart is depicted for a process 300 of communication according to one example. As shown in FIG. 3, the process 300 begins at block 310 with the computing system receiving a data set including a plurality of data items. At block 312, the computing system analyzes the data set to determine a plurality of distinct data values of the plurality of data items. At block 314, the computing system associates, based on the analysis of the data set at block 312, each distinct data value with a respective wavelength among a plurality of wavelengths. At block 316, the transmitter transmits each data item, one data item at a time, as an optical signal at the wavelength associated with the distinct data value of the data item. For example, at block 316, the process can include transmitting a pulse of electromagnetic energy from an EMR source for each data item.

Figure 4:
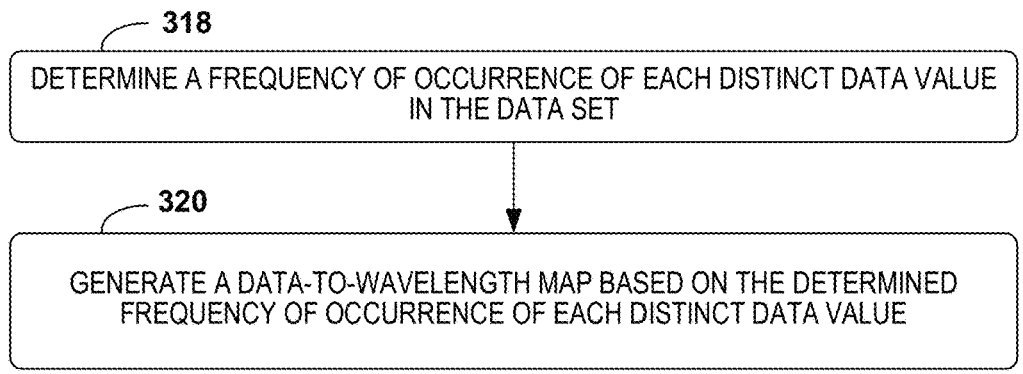
FIG. 4 depicts a flow chart of an example process for communication, according to an example embodiment.
Figure 5:
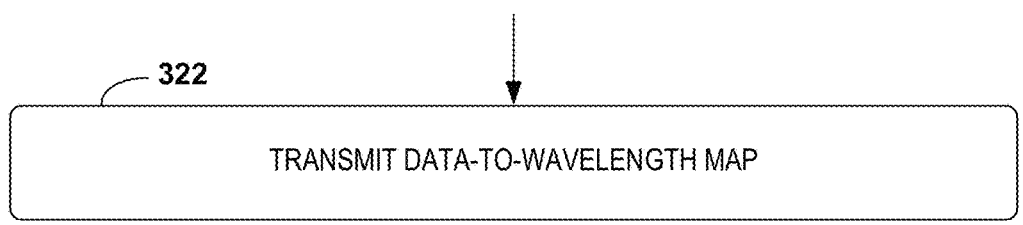
FIG. 5 depicts a flow chart of an example process for communication, according to an example embodiment.
Figure 6:
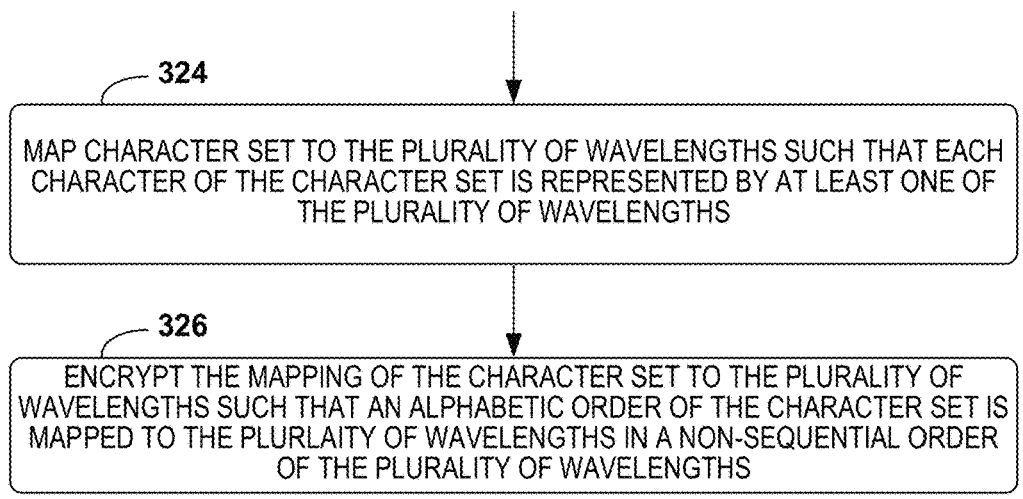
FIG. 6 depicts a flow chart of an example process for communication, according to an example embodiment.

FIGS. 4-6 depict additional aspects of the process 300 according to further examples. As shown in FIG. 4, the process 300 can include the computing system analyzing the data set at block 312 by determining a frequency of occurrence of each distinct data value in the data set at block 318. Also, in FIG. 4, the process 300 can include the computing system associating each distinct data value with the respective wavelength at block 314 by generating a data-to-wavelength map based on the determined frequency of occurrence of each distinct data value at block 320.

As shown in FIG. 5, the process 300 can further include the transmitter transmitting the data-to-wavelength map at block 322. Within examples, the transmitter can transmit the data-to-wavelength map at block 322 before, during, or after the transmitter transmits the electromagnetic energy pulses at block 316. Transmitting the data-to-wavelength map from a first communication device to a second communication device may be beneficial in scenarios in which the second communication device does not otherwise have access to the data-to-wavelength map.

FIG. 6 shows an example of the process 300 in which the plurality of distinct data values include a character set of a language. In FIG. 6, the step of associating each distinct data value with the respective wavelength at block 314 includes (i) mapping the character set to the plurality of wavelengths such that each character of the character set is represented by at least one of the plurality of wavelengths at block 324, and (ii) encrypting the mapping of the character set to the plurality of wavelengths such that an alphabetic order of the character set is mapped to the plurality of wavelengths in a non-sequential order of the plurality of wavelengths at block 326.

Figure 7:
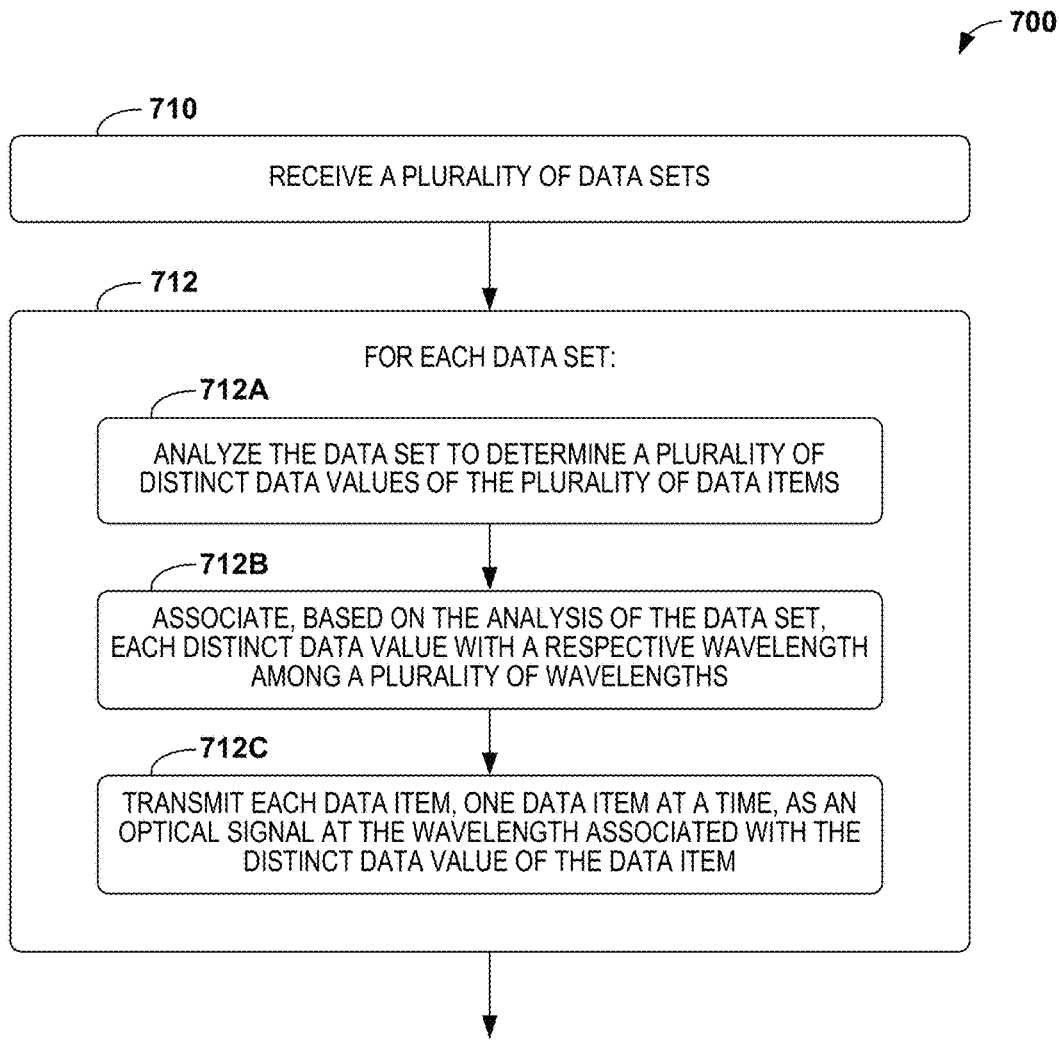
FIG. 7 depicts a flow chart of an example process for communication, according to an example embodiment.

Referring now to FIG. 7, a flowchart is depicted for a process 700 of communication according to one example. As shown in FIG. 7, the process 700 begins at block 710 with a computing system receiving a plurality of data sets. At block 712, for each data set, the computing system (i) analyzes the data set to determine a plurality of distinct data values of the data set at block 712A, (ii) associates, based on the analysis of the data set, each distinct data value of the data set with a respective wavelength among a plurality of wavelengths at block 712B, and (iii) causes a transmitter to transmit each data item of the data set, one data item at a time, as an optical signal at the wavelength associated with the distinct data value of the data item at block 712C. At least two data sets of the plurality of data sets include at least one data item, which is (a) of the same distinct data value and (b) associated with a different wavelength of the plurality of wavelengths.

Figure 8:
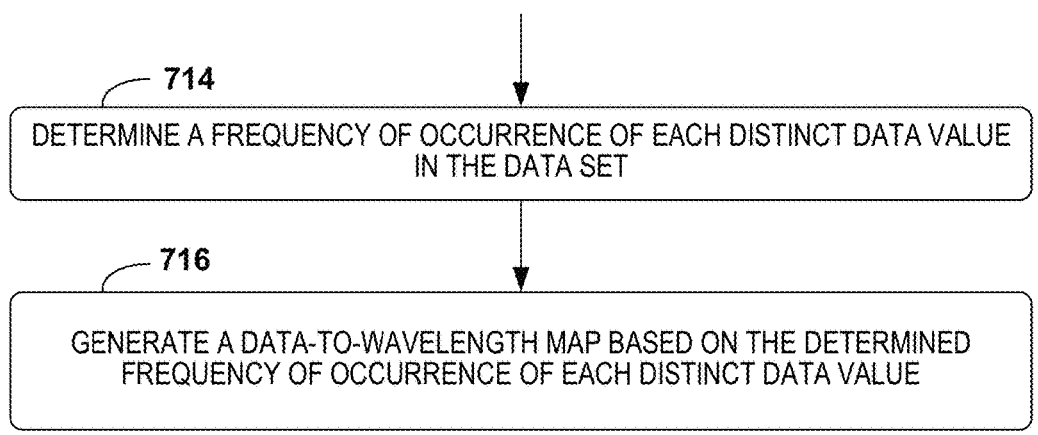
FIG. 8 depicts a flow chart of an example process for communication, according to an example embodiment.
Figure 9:
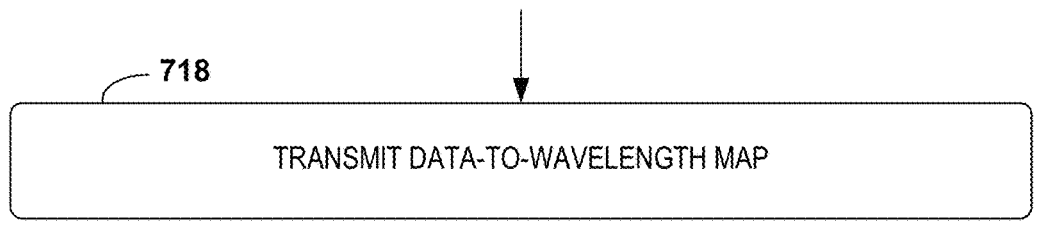
FIG. 9 depicts a flow chart of an example process for communication, according to an example embodiment.

FIGS. 8-9 depict additional aspects of the process 700 according to further examples. As shown in FIG. 8, the process 700 can include the computing system analyzing the data set at block 712A by determining a frequency of occurrence of each distinct data value in the data set at block 714. Also, in FIG. 4, the process 700 can include the computing system associating each distinct data value with the respective wavelength at block 712B by generating a data-to-wavelength map based on the determined frequency of occurrence of each distinct data value at block 716. As shown in FIG. 9, the process 700 can further include the transmitting the data-to-wavelength map at block 718.

IV. Example Variations

Figure 10:
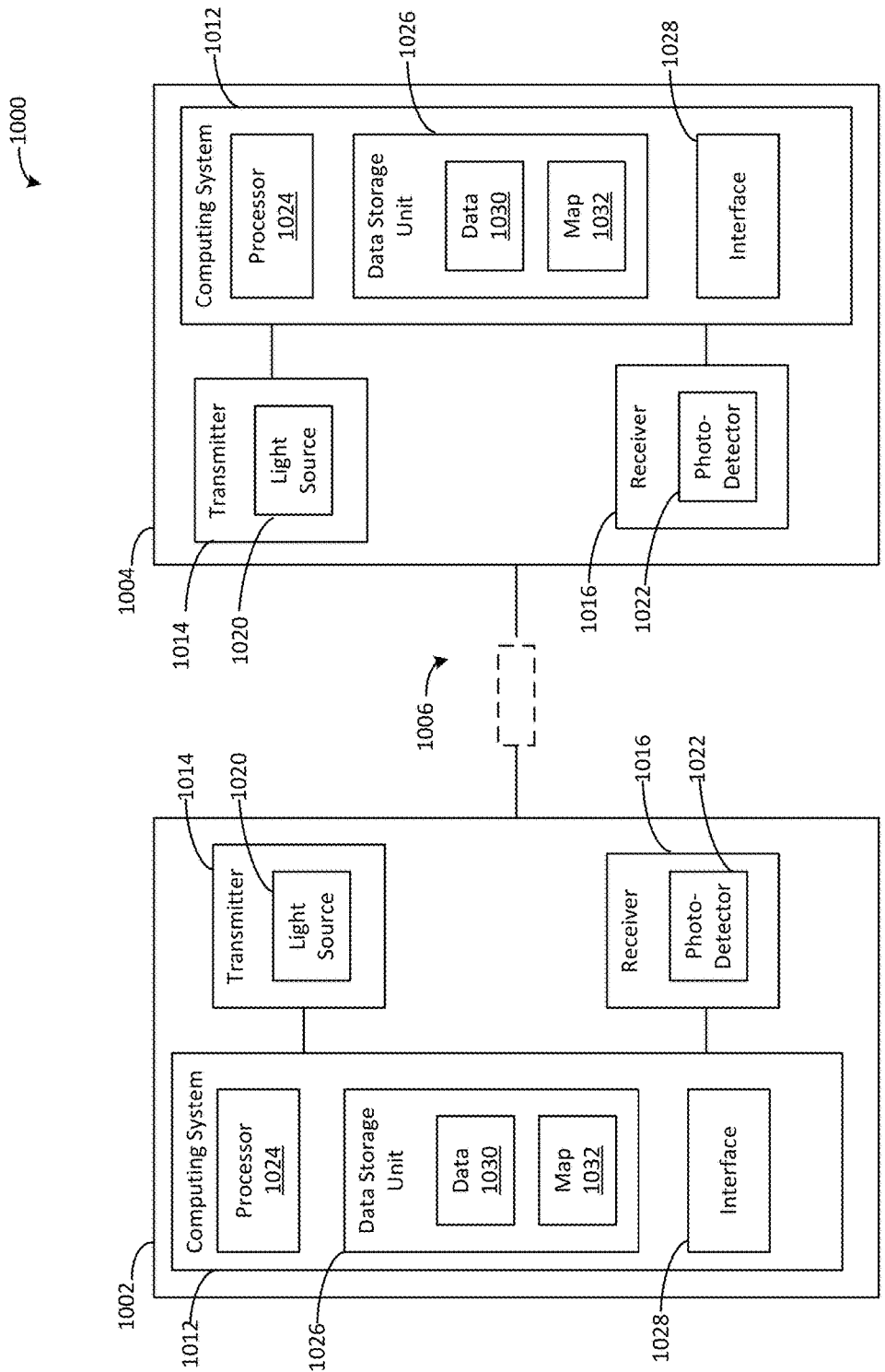
FIG. 10 depicts a simplified block diagram of a communication system according to another example embodiment.

In FIG. 1, the first optical communication device 102 and the second optical communication device 104 are configured for unidirectional communication; however, in additional or alternative embodiments, the optical communication devices can be configured for bidirectional communication. To do so, the optical communication devices of such system can each include both a transmitter and a receiver. As an example, FIG. 10 depicts a communication system 1000 including a first optical communication device 1002 and a second optical communication device 1004 configured for bidirectional communication via an optical communication link 1006 according to another example embodiment. As shown in FIG. 10, the first optical communication device 1002 and the second optical communication device 1004 each include a computing system 1012, a transmitter 1014, a receiver 1016, an EMR source 1020, a photodetector 1022, a processor 1024, a data storage unit 1026 storing a data set 1030 and a data-to-wavelength map 1032, and a communication interface 1028, which function as described above.

Additionally, although the optical communication link 106, 1006 in FIGS. 1 and 10 includes the optical fiber 108, 1008, the optical communication link 106, 1006 can be wireless in other examples.

Still further, in additional or alternative embodiments, the computing system of an optical communication device can process a data set using a compression algorithm before mapping the data items of the data set to the wavelengths. For example, in FIG. 1, the first computing system 112 can use a lossless compression technique such as Huffman coding, run length encoding, and/or Lempel Ziv coding techniques to compress the data items. The first computing system 112 can then analyze the data set based on the compressed data items to determine distinct data values and then associate such distinct data values with the wavelengths.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to explain the principles of the disclosure, the practical application, and to enable others of ordinary skill in the art to understand the disclosure with various modifications as are suited to the particular use contemplated.

What is claimed is:

1. A method of communication comprising:
receiving a data set comprising a plurality of data items;
analyzing the data set to determine a plurality of distinct data values of the plurality of data items;
associating, based on the analysis of the data set, each distinct data value with a respective wavelength among a plurality of wavelengths;
generating a data-to-wavelength map that indicates for each distinct data value, on a per distinct data value basis, the respective wavelength associated with the distinct data value; and
transmitting each data item, one data item at a time, as an optical signal at the wavelength associated with the distinct data value of the data item.

2. The method of claim 1, wherein analyzing the data set comprises determining a frequency of occurrence of each distinct data value in the data set, and
wherein associating each distinct data value with the respective wavelength comprises generating the data-to-wavelength map based on the determined frequency of occurrence of each distinct data value.

3. The method of claim 2, further comprising transmitting the data-to-wavelength map.

4. The method of claim 1, wherein the plurality of distinct data values comprises a range of values represented by a quantity of binary bits.

5. The method of claim 4, wherein the quantity of binary bits is eight such that each distinct data value corresponds to a respective byte value.

6. The method of claim 1, wherein transmitting each data item comprises transmitting a pulse of electromagnetic energy from an electromagnetic radiation (EMR) source for each data item.

7. The method of claim 1, wherein the plurality of wavelengths comprises a range of wavelengths from 1260 nm to 1675 nm.

8. The method of claim 7, wherein the plurality of wavelengths further comprises another range of wavelengths from 420 nm to 700 nm.

9. The method of claim 1, wherein the plurality of distinct data values comprise a plurality of text characters.

10. The method of claim 9, wherein the plurality of distinct data values further comprise a text string, wherein the text string comprises two or more of the plurality of text characters.

11. The method of claim 1, wherein the plurality of distinct data values comprise a character set of a language, and wherein associating each distinct data value with the respective wavelength comprises:
mapping the character set to the plurality of wavelengths such that each character of the character set is represented by at least one of the plurality of wavelengths; and
encrypting the mapping of the character set to the plurality of wavelengths such that an alphabetic order of the character set is mapped to the plurality of wavelengths in a non-sequential order of the plurality of wavelengths.

12. A communication system comprising:
an electromagnetic radiation (EMR) source configured to transmit a plurality of optical signals at a plurality of wavelengths;
a non-transitory computer readable media configured to store a data set comprising a plurality of data items; and
a processor configured to:
analyze the data set to determine a plurality of distinct data values of the plurality of data items,
associate, based on the analysis of the data set, each distinct data value with a respective wavelength among the plurality of wavelengths, and
cause the EMR source to transmit each data item, one data item at a time, at the wavelength associated with the distinct data value of the data item,
wherein at least one data item of data set has a different quantity of bits than at least another data item of the data set.

13. The system of claim 12, further comprising an optical fiber coupled to the EMR source,
wherein the EMR source is configured to transmit, over the optical fiber, each data item as a pulse of electromagnetic energy at the wavelength associated with the distinct data value of the data item.

14. The system of claim 12, wherein, to analyze the data set, the processor is configured to determine a frequency of occurrence of each distinct data value in the data set,
wherein, to associate each distinct data value with the respective wavelength, the processor is configured to generate a data-to-wavelength map based on the determined frequency of occurrence of each distinct data value, and
wherein the data-to-wavelength map indicates for each distinct data value, on a per distinct data value basis, the respective wavelength associated with the distinct data value.

15. The system of claim 14, wherein the processor is configured to cause the EMR source to transmit the data-to-wavelength map.

16. A method of communication comprising:
receiving a plurality of data sets, wherein each data set comprises a respective plurality of data items; and
for each data set:
analyzing the data set to determine a plurality of distinct data values of the data set,
associating, based on the analysis of the data set, each distinct data value of the data set with a respective wavelength among a plurality of wavelengths, and
transmitting each data item of the data set, one data item at a time, as an optical signal at the wavelength associated with the distinct data value of the data item, and
generating a data-to-wavelength map that indicates for each distinct data value, on a per distinct data value basis, the respective wavelength associated with the distinct data value;
wherein at least two data sets of the plurality of data sets include at least one data item, which is (i) of the same distinct data value and (ii) associated with a different wavelength of the plurality of wavelengths, and
wherein the data-to-wavelength map is different for the at least two data sets of the plurality of data sets.

17. The method of claim 16, wherein the plurality of distinct data values of the plurality data sets comprise a first set of distinct data values and a second set of distinct data values, wherein the first set of distinct data values is statically associated with a first portion of the plurality of wavelengths for the plurality of data sets, and wherein the second set of distinct data values is dynamically associated with a second portion of the plurality of wavelengths for each data set, on a data set by data set basis, based on the analysis of the data set.

18. The method of claim 16, wherein analyzing the data set comprises determining a frequency of occurrence of each distinct data value in the data set, and wherein associating each distinct data value with the respective wavelength comprises generating the data-to-wavelength map based on the determined frequency of occurrence of each distinct data value.

19. The method of claim 18, further comprising transmitting the data-to-wavelength map.

20. The method of claim 16, wherein the plurality of distinct data values comprise a plurality of text characters and a text string, wherein the text string comprises two or more of the plurality of text characters.

21. The method of claim 16, wherein the plurality of distinct data values comprise a plurality of text characters from a plurality of different languages.

22. The method of claim 16, further comprising, for each data set, processing the plurality of data items of the data set using a compression algorithm to determine a plurality of compressed data items, wherein, for each data set, analyzing the data set to determine the plurality of distinct data values of the data set comprises analyzing the data set based on the plurality of compressed data items to determine the plurality of distinct data values.

* * * * *